United States Patent [19]

Katzenberger

[11] Patent Number: 5,771,033
[45] Date of Patent: Jun. 23, 1998

[54] METHOD AND SYSTEM FOR DISSOLVING AN IMAGE DISPLAYED ON A COMPUTER SCREEN

[75] Inventor: Gary Shon Katzenberger, Woodinville, Wash.

[73] Assignee: Microsoft Corporation, Redmond, Wash.

[21] Appl. No.: 653,590

[22] Filed: May 24, 1996

[51] Int. Cl.$^6$ .................................................. G09G 5/00
[52] U.S. Cl. .......................... 345/132; 345/153; 345/112
[58] Field of Search ................................... 345/112, 132, 345/155, 153, 147, 3, 139

[56] References Cited

U.S. PATENT DOCUMENTS

| | | | |
|---|---|---|---|
| 5,287,093 | 2/1994 | Amano et al. | 345/139 |
| 5,515,449 | 5/1996 | Tsuruoka et al. | 382/128 |
| 5,657,248 | 8/1997 | Hamada et al. | 345/112 |
| 5,664,080 | 9/1997 | Lucas et al. | 345/155 |

OTHER PUBLICATIONS

Morton, Mike; "A Digital 'Dissolve' Effect", *Graphic Gems*, Academic Press, Inc., 1990, pp. 221–232.

*Primary Examiner*—Richard Hjerpe
*Assistant Examiner*—Kent Chang
*Attorney, Agent, or Firm*—Jones & Askew, LLP

[57] ABSTRACT

In association with a computer system, a method and system for implementing a graphical dissolve effect of a first image into a second image displayed on a computer screen. The sequence in which each pixel comprising the first image is replaced with a corresponding pixel in the second image is determined mathematically such that the sequence appears random, thereby producing a dissolve effect that is visually pleasing. The sequence in which the pixels of a first image having a width and height of "w" and "h" pixels, respectively, are replaced is determined by first selecting a value for the variables p and m. The number p is a prime number and the number m is selected such that the numbers m, $m^2$, $m^3$, . . . , $m^{p-1}$, when taken modulo p, yield a reordering of the numbers 1, 2, 3, . . . , p–1. A random number $k_0$ is selected between 1 and p–1 and a number k is set equal to $k_0$. A number j is then calculated according to the formula j=(w*h)+k–p. If j is non-negative, pixel number j in the first image is dissolved by replacing it with the corresponding pixel from the second image. A new number j is then calculated according to the formula $j_{new}$=j–(p–1). If j is negative, a new value for the number k is calculated according to the formula $k_{new}$=(k*m) mod p and then a new value of j is calculated according to the formula above using $k_{new}$. The entire first 30 image is dissolved when the value of $k_{new}$ is equal to $k_0$.

18 Claims, 11 Drawing Sheets p=7
m=3

$m^i|_{i=1,\cdots,p-1}$    3, 9, 27, 81, 243, 729

$m^i \bmod p|_{i=1,\cdots,p-1}$    3, 2, 6, 4, 5, 1

FIG. 4

|  | COLUMN 0 | COLUMN 1 | COLUMN 2 | COLUMN 3 |
|---|---|---|---|---|
| ROW 0 | 0 | 1 | 2 | 3 |
| ROW 1 | 4 | 5 | 6 | 7 |
| ROW 2 | 8 | 9 | 10 | 11 | x →, y ↓, 140, h=3, W=4

FIG. 5

SEQUENCE OF PIXEL DISSOLVE ($K_O=3$)
J=8,2,7,1,11,5,9,3,10,4,6,0

| TABLE ENTRY | TABLE 0 | TABLE 1 | TABLE 2 | TABLE 3 | TABLE 4 | TABLE 5 | TABLE 6 | TABLE 7 |
|---|---|---|---|---|---|---|---|---|
| 0 | 0x00000000 | 0x00000000 | 0x00000000 | 0x00000000 | 0x00000000 | 0x00000000 | 0x00000000 | 0x00000000 |
| 1 | 0x00000200 | 0x00400000 | 0x00000000 | 0x00400000 | 0x00000000 | 0x00400000 | 0x00000000 | 0x04000000 |
| 2 | 0x00000208 | 0x00400004 | 0x00000020 | 0x00400020 | 0x00000100 | 0x00400040 | 0x00000004 | 0x84000000 |
| 3 | 0x00000208 | 0x00420004 | 0x00200020 | 0x00400020 | 0x00002100 | 0x00400040 | 0x00020004 | 0x84000010 |
| 4 | 0x40000208 | 0x00420004 | 0x002000A0 | 0x00400A00 | 0x00002100 | 0x08400040 | 0x40020004 | 0x84000110 |
| 5 | 0x40000218 | 0x20420004 | 0x082000A0 | 0x00400A80 | 0x00042100 | 0x28400040 | 0x60020004 | 0x84000110 |
| 6 | 0x40000121A | 0x20420006 | 0x082000A0 | 0x00C00A80 | 0x00042900 | 0x28400140 | 0x61020004 | 0x84040110 |
| 7 | 0x40001121A | 0x20420806 | 0x082800A0 | 0x00C01A80 | 0x00062900 | 0x29400940 | 0x61020014 | 0x84040114 |
| 8 | 0x4040121A | 0xA0420806 | 0x882800A4 | 0x00C09A80 | 0xC0062900 | 0x29400940 | 0x610A0014 | 0x84240114 |
| 9 | 0x4040521A | 0xA4420806 | 0x892800A4 | 0x00C29A80 | 0xC0062901 | 0x29400942 | 0xE10A0014 | 0x84240154 |
| 10 | 0x4044521A | 0xA4430806 | 0x892800A4 | 0x00E29A80 | 0xC0072901 | 0x29440942 | 0xE10A0016 | 0x94240154 |
| 11 | 0x4045521A | 0xA4430C06 | 0x892900A4 | 0x20E29A80 | 0xC8072901 | 0x29440946 | 0xE10B0016 | 0x94A40154 |
| 12 | 0x4047521A | 0xA6430C06 | 0x8D2D00A4 | 0x24E29A82 | 0xC8272901 | 0x29440946 | 0xE14B0816 | 0x94A4215C |
| 13 | 0x4047521A | 0xA6470C06 | 0x8D2D00B4 | 0x24E29A82 | 0xC8272901 | 0x29440946 | 0xE14B081E | 0x94A4215C |
| 14 | 0x4847521A | 0xA6471E06 | 0x8D3D40B4 | 0x2CE29A82 | 0xC8272941 | 0x2B440946 | 0xC34B081E | 0x94A4A15C |
| 15 | 0x484F5A1A | 0xA6471E07 | 0x8D8D3F40B4 | 0x2CE29A83 | 0xC8273941 | 0x2B550946 | 0xE34B081E | 0x94A4A15C |
| 16 | 0x584F5A5A | 0xE6471E07 | 0xCD3F40B4 | 0x6CE29A83 | 0xC9273941 | 0x2B5509C6 | 0xE36B081E | 0x94E4A55E |
| 17 | 0x584F5ADA | 0xE6471E27 | 0xCD3F42B4 | 0x6CE29B83 | 0xC9273941 | 0x2B5709C6 | 0xE36B181E | 0x94E4A55E |
| 18 | 0x5A4F5ADA | 0xE6671E27 | 0xCD3F42F4 | 0x6CE29BC3 | 0xC92F39C5 | 0x2BD709C6 | 0xE36B581E | 0x94F4A55E |
| 19 | 0x5A4F7ADA | 0xE66F1E27 | 0xCD3F46F4 | 0x6CE29BC7 | 0xC92F39C7 | 0x2BD729C6 | 0xE36B581E | 0x94F4A75E |
| 20 | 0x5ACF7ADA | 0xE66F3EA7 | 0xCD7F46F4 | 0xECEF39BC7 | 0xCD3F39C7 | 0x2BD72BC6 | 0xF36B5C1E | 0x94F6A75E |
| 21 | 0x5ACF7BDA | 0xE67F3EA7 | 0xCF7F46F4 | 0xEEEF29BCF | 0xCD3F3DC7 | 0x3BD72BC6 | 0xF36B7C1E | 0x95F6A75E |
| 22 | 0xDACF7BDA | 0xE67F3EA7 | 0xCF7FC6F4 | 0xEEFF39BCF | 0xDD3F3DC7 | 0x3BD72BC6 | 0xF37F7C1E | 0x9DF6E75E |
| 23 | 0xDECF7BDA | 0xE67F7EA7 | 0xCFFFC6FC | 0xEFF3DBCF | 0xFD3F3DC7 | 0x3FD7ABC6 | 0xF37FFC1E | 0x9DFEE75E |
| 24 | 0xFECF7BDA | 0xE67F7EA7 | 0xCFFFC7FC | 0xEFF3DBCF | 0xFD3F3FC7 | 0x3FF7ABC6 | 0xF37FFC1F | 0xBDFEE75E |
| 25 | 0xFFCF7BFA | 0xE67F7EE7 | 0xCFFFE7FC | 0xEFFF3DBCF | 0xFD7FBFC7 | 0xBFF7ABC6 | 0xF3FFFC1F | 0xBDFEE75E |
| 26 | 0xFFDF7BFA | 0xE67F7EEF | 0xCFFFE7FD | 0xEFFF3DBEF | 0xFD7FBFC7 | 0xBFF7ABC7 | 0xFBFFFC1F | 0xBDFEE75E |
| 27 | 0xFFFF7BFA | 0xE6FFFFEF | 0xDFFFEFFF | 0xEFFF3DFEF | 0xFD7FBFDF | 0xBFF7BBCF | 0xFBFFFC1F | 0xBDFEE77F |
| 28 | 0xFFFF7FFA | 0xE6FFFFEE | 0xDFFFEFFF | 0xEFFF3FFEF | 0xFD7FBFEF | 0xBFF7BBEF | 0xFBFFFD1F | 0xBDFEE77F |
| 29 | 0xFFFF7FFB | 0xE6FFFFEF | 0xDFFFFEFFD | 0xEFFF7FFEF | 0xFD7FBFEF | 0xBFF7BFEF | 0xFBFFFDF3F | 0xBDFEFF7F |
| 30 | 0xFFFFFFFB | 0xE6FFFFFF | 0xFFFFFFFFD | 0xEFFF7FFFE | 0xFD7FFFFFF | 0xBFF7FFFFF | 0xFBFFFDF7F | 0xBDFFFFF7F |
| 31 | 0xFFFFFFFF | 0xE7FFFFFF | 0xFFFFFFFFF | 0xEFFF7FFFF | 0xFFFFFFFFF | 0xFFF7FFFFF | 0xFBFFFFFFF | 0xBDFFFFFFF |
| 32 | 0xFFFFFFFF | 0xFFFFFFFF | 0xFFFFFFFF | 0xFFFFFFFF | 0xFFFFFFFF | 0xFFFFFFFF | 0xFFFFFFFF | 0xFFFFFFFF |

0% OPACITY

INCREASING OPACITY →

100% OPACITY

METHOD AND SYSTEM FOR DISSOLVING AN IMAGE DISPLAYED ON A COMPUTER SCREEN

TECHNICAL FIELD

The present invention relates generally to the display of graphical effects on a computer screen and, more specifically, to a system and method for manipulating the display of pixels on a pixel-oriented display device to gradually dissolve an image displayed on the display device.

BACKGROUND OF THE INVENTION

Improvements in computer technology have provided computing devices with the capability to render realistic graphical images. The improvements have been due, in large part, to the development of computer monitors capable of rendering images with near-photographic resolution and to the continued growth of processing power that allows high-resolution images to be manipulated at acceptable speeds. As a result, computing devices are now able to process and display motion videos, such as movies and action video games.

Images generated by the computing device are displayed on a pixel-oriented display device, typically a computer monitor. The term "monitor" typically refers to the video display and its housing. The monitor's video display is typically a cathode ray tube (CRT), although other video displays may include a liquid crystal display (LCD) or any other type of display capable of rendering images visible to the user. The CRT has a phosphor layer on the inner surface of the front of the tube. The outer surface of the tube, i.e., the surface facing the viewer of the monitor on which the images are displayed, is typically called the "computer screen".

A computer screen displays graphical and other images by illuminating picture elements on the CRT. A picture element, or "pixel", is the smallest area of a computer screen that can be manipulated to create an image. In a color monitor, each pixel comprises an element for each of the primary colors red, green, and blue. By varying the intensity of the three elements, a pixel can display nearly any desired color.

Each pixel on the computer screen is identified by its location on the screen and can be illuminated at varying levels of brightness and at various colors. Colors are displayed on the computer screen in connection with a palletized graphics device or a non-palletized graphics device. In a non-palletized device, a pixel value for each pixel on the screen encodes the color at which each respective pixel is to be displayed. For example, in an eight bit red, green, blue (RGB) color system, the pixel value includes each color component as a value of 0–255. As is well known in the art, a pixel value of (255, 0, 0) constitutes the color red, (0, 255, 0) constitutes the color green, and (0, 0, 255) constitutes the color blue. Similarly, black is identified by the pixel value (0, 0, 0), white is identified by (255, 255, 255). A pixel value of (127, 0, 127) identifies dark purple because the red and blue components are half intensity and there is no green component.

In a palletized device, the pixel value for each pixel is an index into an array of colors. The array of colors is called the palette. Typically, in an eight bit system, palettes have 256 entries, numbered from 0–255, but may include more or fewer entries. For example, a pixel value of 10 means that the pixel is displayed using color number 10 in the palette.

As is well known in the art, the display of each pixel on the computer screen can be manipulated by the computer system. One of the graphical effects used by computer systems is the "dissolve" effect. A dissolve occurs when an image on the screen (the current image) is replaced, pixel by pixel, with another image (the source image). Thus, the dissolve effect is accomplished by dissolving the image by progressively replacing each pixel of a current image with a corresponding pixel of a source image until the current image is no longer displayed and the source image is completely displayed.

With computer systems today having increasingly elaborate graphics and audio capabilities, many possibilities exist for making computer programs more interesting and entertaining for the user. To create and display a dissolve effect that is visually pleasing to the viewer, the order in which pixels of a current image are replaced with pixels of a source image should appear to be random. A random order of pixel replacement creates what appears to be a smooth fade or transition. If the order in which pixels are replaced on the screen during the dissolve effect is not random, undesirable, visually-recognizable patterns are displayed. For example, if a fixed pattern of pixels are replaced on the screen during the dissolve effect, such as alternating pixels or the first pixel of every five contiguous pixels in a row, a "checkerboard" or "striping" effect is displayed. These effects are visually displeasing.

Additionally, each pixel in the current image that is replaced on the screen should not be replaced again during the dissolve sequence. Thus, each pixel should be replaced on the screen only one time during the dissolve sequence. For example, if a pixel of the current image that has been replaced with a pixel of the source image is replaced again with the pixel of the current image, then the pixel must again be replaced with the pixel of the source image to complete the dissolve sequence. Such mulitple replacements of pixels produces a visually undesirable "sparkling" effect.

Many computer programs that provide dissolve effects do not determine the replacement of pixels in a seemingly random order. Therefore, many of the prior implementations of dissolve effects include undesirable visual effects during the dissolve sequence. Additionally, because any determination of a random order of pixels is potentially expensive in terms of the processing time required of the computing device, any system for providing such a seemingly random order of pixels should require a minimum of processor time.

SUMMARY OF THE INVENTION

The present invention is directed to a method and system for implementing a graphical dissolve of an image displayed on a computer screen. The pixels representing an image are replaced on the computer screen in a mathematically-determined order that appears random, thereby producing a dissolve effect that is visually pleasing.

In accordance with a first aspect of the present invention, the sequence in which the pixels of a current image are replaced is determined by first selecting a value for the variables p and m. The number p is a prime number and the number m is selected such that the numbers $m, m^2, m^3, \ldots, m^{p-1}$, when taken modulo p, yield a reordering of the numbers $1, 2, 3, \ldots, p-1$. A random number $k_0$ is selected between 1 and p−1 and a number k is set equal to $k_0$. A number j is then S calculated according to the formula $j=(w*h)+k-p$, where w and h are the width and height, respectively, of the image in pixels. If j is non-negative, pixel number j in the current image is dissolved by replacing it with the corresponding pixel in the source image. A number $j_{new}$ is then calculated according to the formula $j_{new}=j-(p-1)$. The number j is then set equal to $j_{new}$. If the new value of j is non-negative, the pixel number corresponding to the new value of j is replaced, as described above.

If j is negative, a new value for the number k is calculated according to the formula $k_{new}=(k*m)$ mod p, where the operator mod is the modulo operator. A new value of j is calculated according to the formula above by using the new value of k, $k_{new}$. All pixels in the image have been dissolved when the value of knew is equal to $k_0$.

In accordance with a second aspect of the present invention, an image is displayed at a particular level of opacity on the display screen by selecting a dither pattern corresponding to the desired level of opacity. The image is divided into tiles 32 pixels in width and one pixel in height. The dither pattern is a 32 bit word, each bit in the dither pattern corresponding to a pixel in a tile. When a bit in the dither pattern is 1, the corresponding pixel is displayed opaque. If a bit in the dither pattern is 0, the corresponding bit is transparent.

The pixels in each tile in a row are displayed according to the dither pattern. A new dither pattern is then created by shifting the dither pattern by a random number of bits. The pixels of another row are displayed according to the new dither pattern. New dither patterns are created for each row in the image, thereby generating an image having a desired level of opacity that is displayed on the computer screen in a visually-pleasing manner.

If no dither pattern exactly corresponds to the desired opacity level, the dither pattern used for each row is determined by first determining the desired opacity level ($O_D$). A dither pattern is selected from among a plurality of dither patterns corresponding to different levels of opacity. The selected dither pattern is selected such that it has an actual opacity level ($O_A$) closest to, but not exceeding, $O_D$. The pixels in each tile in a row are displayed according to the selected dither pattern. An opacity error ($O_E$) is then calculated according to the formula $O_E=O_D-O_A$. The opacity level for a subsequent row is calculated according to the formula $O_i=O_D+O_E$. A dither pattern is then selected having an actual opacity level $O_A$ closest to, but not exceeding, $O_i$. The pixels in each tile in the subsequent row are displayed according to the selected dither pattern. An error is then calculated according to the formula $O_E=O_i-O_A$ and this value of $O_E$ is used to calculate $O_i$ for another subsequent row. The present invention utilizes this method to determine the dither pattern to use for each row in the image. In this manner, a visually-pleasing image is displayed at any opacity level.

BRIEF DESCRIPTION OF THE DRAWINGS

FIG. 4 discloses the mathematical formulas that define a proper determination of the variables p and m in accordance with the preferred embodiment of the present invention.

FIG. 5 is a diagram showing the pixels of an image to be dissolved on the computer screen.

FIGS. 6A–M are diagrams showing the image after each successive pixel is replaced in accordance with the preferred embodiment of the present invention.

FIG. 12 is a chart showing various dither patterns associated with particular levels of opacity, in accordance with a second embodiment of the present invention.

DETAILED DESCRIPTION

Figure 1:
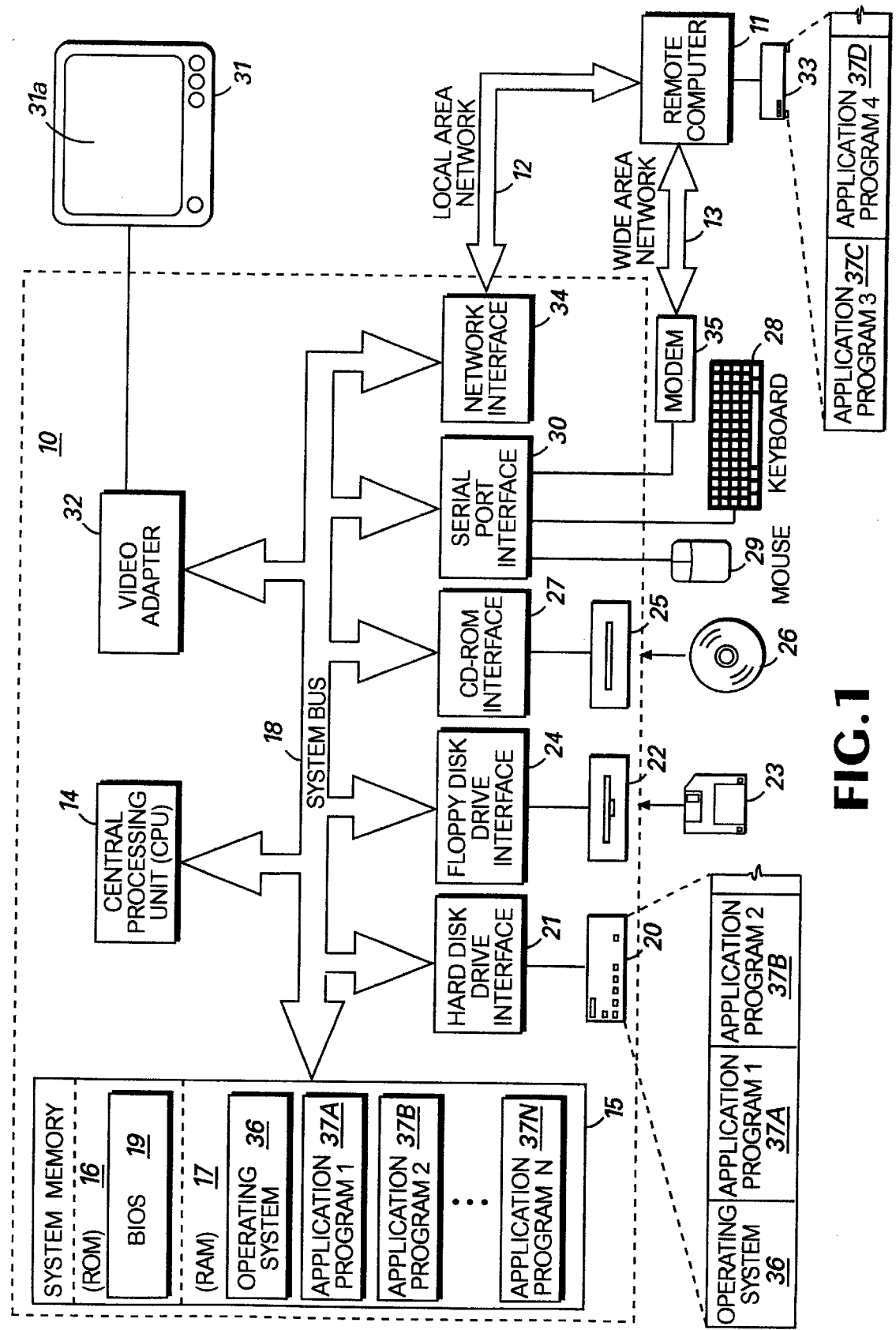
FIG. 1 is a block diagram of a computer system representing the operating environment for the preferred embodiment of the present invention.

The present invention is directed to a method for dissolving an image displayed on the display screen of a computer monitor. The dissolve effect is implemented by selecting a sequence for replacing pixels in a current image with corresponding pixels in a source image during a predetermined period of time. Mathematical formulas are used to identify a pseudo-random sequence of pixels. Each pixel in the sequence is replaced on the display screen in the pseudo-random order, thus providing a visually-pleasing dissolve effect free of undesirable striping or other visually detectable effects. In such a manner, the image is slowly dissolved.

Although the preferred embodiment will be generally described in the context of an application program and an operating system running on a personal computer, those skilled in the art will recognize that the present invention also can be implemented in conjunction with other program modules for other types of computers. Furthermore, those skilled in the art will recognize that the present invention may be implemented in a stand-alone or in a distributed computing environment. In a distributed computing environment, program modules may be physically located in different local and remote memory storage devices. Execution of the program modules may occur locally in a stand-alone manner or remotely in a client/server manner. Examples of such distributed computing environments include local area networks of an office, enterprise-wide computer networks, and the global Internet. Accordingly, it will be understood that the terms computer, operating system, and application program generally include all types of computers and the program modules designed for them.

Turning first to the nomenclature of the specification, the detailed description which follows is represented largely in terms of processes and symbolic representations of operations by conventional computer components, including a local central processing unit (CPU), memory storage devices for the local CPU, display devices, and input devices. Furthermore, these processes and operations may utilize conventional computer components in a heterogeneous distributed computing environment, including remote file servers, computer servers, and memory storage devices. Each of these conventional distributed computing components is accessible to the local CPU by a communication network.

The processes and operations performed by the computer include the manipulation of data bits by a local CPU or remote server and the maintenance of these bits within data structures resident in one or more of the local or remote memory storage devices. Such data structures impose a physical organization upon the collection of data bits stored within a memory storage device and represent specific electrical or magnetic elements. These symbolic representations are the means used by those skilled in the art of computer programming and computer construction to most effectively convey teachings and discoveries to others skilled in the art.

For the purposes of this discussion, a process is generally conceived to be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, bytes, pixel values, works, values, elements, symbols, characters, terms, numbers, points, records, objects, images, files or the like. It should be kept in mind, however, that these and similar terms should be associated with appropriate physical quantities for computer operations, and that these terms are merely conventional labels applied to physical quantities that exist within and during operation of the computer. For example, each pixel on a computer screen is controlled by the computer system by a pixel value signal corresponding to each respective pixel. Responsive to the pixel value, the computer system operates to manipulate the illumination, color, and other display characteristics of each pixel on the computer screen. Thus, control of the pixel value causes a corresponding control of the physical display of the respective pixel on the computer screen.

It should also be understood that manipulations within the computer are often referred to in terms such as adding, comparing, moving, positioning, placing, illuminating, removing, altering, etc. which are often associated with manual operations performed by a human operator. The operations described herein are machine operations performed in conjunction with various input provided by a human operator or user that interacts with the computer. The machines used for performing the operation of the present invention include local or remote general purpose digital computers or other similar computing devices.

In addition, it should be understood that the programs, processes, method, etc. described herein are not related or limited to any particular computer or apparatus nor are they related or limited to any particular communication network architecture. Rather, various types of general purpose machines may be used with program modules constructed in accordance with the teachings described herein. Similarly, it may prove advantageous to construct a specialized apparatus to perform the method steps described herein by way of dedicated computer systems in a specific network architecture with hard-wired logic or programs stored in nonvolatile memory, such as read only memory.

Turning now to the drawings, in which like numerals indicate like elements throughout the several figures, FIG. 1 illustrates a computer system on which the preferred embodiment of the present invention is implemented. As shown in FIG. 1, the computer 10 is in a networked environment with logical connections to a remote computer 11. The logical connections between the computer 10 and the remote computer 11 are represented by a local area network 12 and a wide area network 13. Those of ordinary skill in the art will recognize that in this client/server configuration, the remote computer 11 may function as a file server or compute server.

The computer 10 includes a central processing unit (CPU) 14, such as the 80486 or "PENTIUM" microprocessors manufactured by Intel Corporation of Santa Clara, Calif. The CPU 14 is not limited to an Intel model processor, and can be implemented by other processors such as a member of the MIPS family by Silicon Graphics, Inc. or a PowerPC processor by Motorola Corporation. The computer also includes system memory 15, including read only memory (ROM) 16 and random access memory (RAM) 17, connected to the CPU by the system bus 18. The BIOS 19 for the computer 10 is stored in ROM 16. Those skilled in the art will recognize that the BIOS 19 is a set of basic routines that helps to transfer information between elements within the computer 10.

Within the computer 10, a local hard disk drive 20 is connected to the system bus 18 via the hard disk drive interface 21. A floppy disk drive 22, which is used to read or write a floppy disk 23, is connected to the system bus 18 via a floppy disk drive interface 24. A CD-ROM drive 25, which is used to read a CD-ROM disk 26, is connected to the system bus 18 via a CD-ROM interface 27. A user enters commands and information into the computer 10 by using a keyboard 28 and/or pointing device, such as a mouse 29, which are connected to the system bus 18 via a serial port interface 30. Other types of pointing devices may include track pads, track balls, data gloves, head-trackers, pens, and other devices suitable for positioning a cursor on a computer monitor 31. The computer monitor 31 includes a pixel-oriented computer screen 31a on which images are displayed. The monitor 31 or other kind of display device is connected to the system bus 18 via a video adapter 32.

The remote computer 11 in the networked environment shown in FIG. 1 is connected to a remote memory storage device 33. This remote memory storage device 33 is typically a large capacity device such as a hard disk drive, CD-ROM drive, magneto-optical drive or the like. The computer 10 is connected to the remote computer 11 by a network interface 34, which is used to communicate over the local area network 12.

As shown in FIG. 1, the computer 10 may also be connected to the remote computer 11 by a modem 35, which is used to communicate over the wide area network 13, such as the Internet. The modem 35 is connected to the system bus 18 via the serial port interface 30. Typically, the modem 35 is also connected to a communications network such as the public switched telephone network (PSTN). Although illustrated in FIG. 1 as external to the computer 10, those of ordinary skill in the art will recognize that a modem 35 may also be internal to the computer 10, thus communicating directly via the system bus 18. It is important to note that connection to the remote computer 11 via both the local area network 12 and the wide area network 13 is not required, but merely illustrates alternative methods of providing a communication path between the computer 10 and the remote computer 11.

Although many other internal components of the computer 10 are not shown, those of ordinary skill in the art will appreciate that such components and the interconnection between them are well known. Accordingly, additional details concerning the internal construction of the computer 10 need not be disclosed in connection with the present invention. It should also be understood that the components and operation of computer 10, as described in FIG. 1, may also be provided within remote computer 11.

Those skilled in the art will understand that program modules such as an operating system 36, application programs 37, and data are provided to the computer 10 via one of the local or remote memory storage devices, which may include the local hard disk drive 20, floppy disk 23, CD-ROM 26, RAM 17, ROM 16, and the remote memory storage device 33. In the preferred computer 10, the local hard disk drive 20 is used to store data and programs, including the operating system and application programs. The program module or application programs 37 preferably include a program that permits graphical images to be displayed to the user via the monitor.

In accordance with the present invention, the display 22 displays an image on the display screen. The image referred to herein in accordance with the present invention is typically a graphical image, but the image may also be a textual or alphanumeric image. Aspects of the present invention disclosed herein relates to the dissolving of an image created via the "3D MOVIE MAKER" application program, manufactured and sold by Microsoft Corporation, assignee of the present invention. However, it should be understood that the present invention is not limited in scope to any particular application program or program module. To the contrary, the present invention is envisioned to be useful and capable of being incorporated into any computer program in which a graphical image displayed on the display screen is dissolved.

Figure 2:
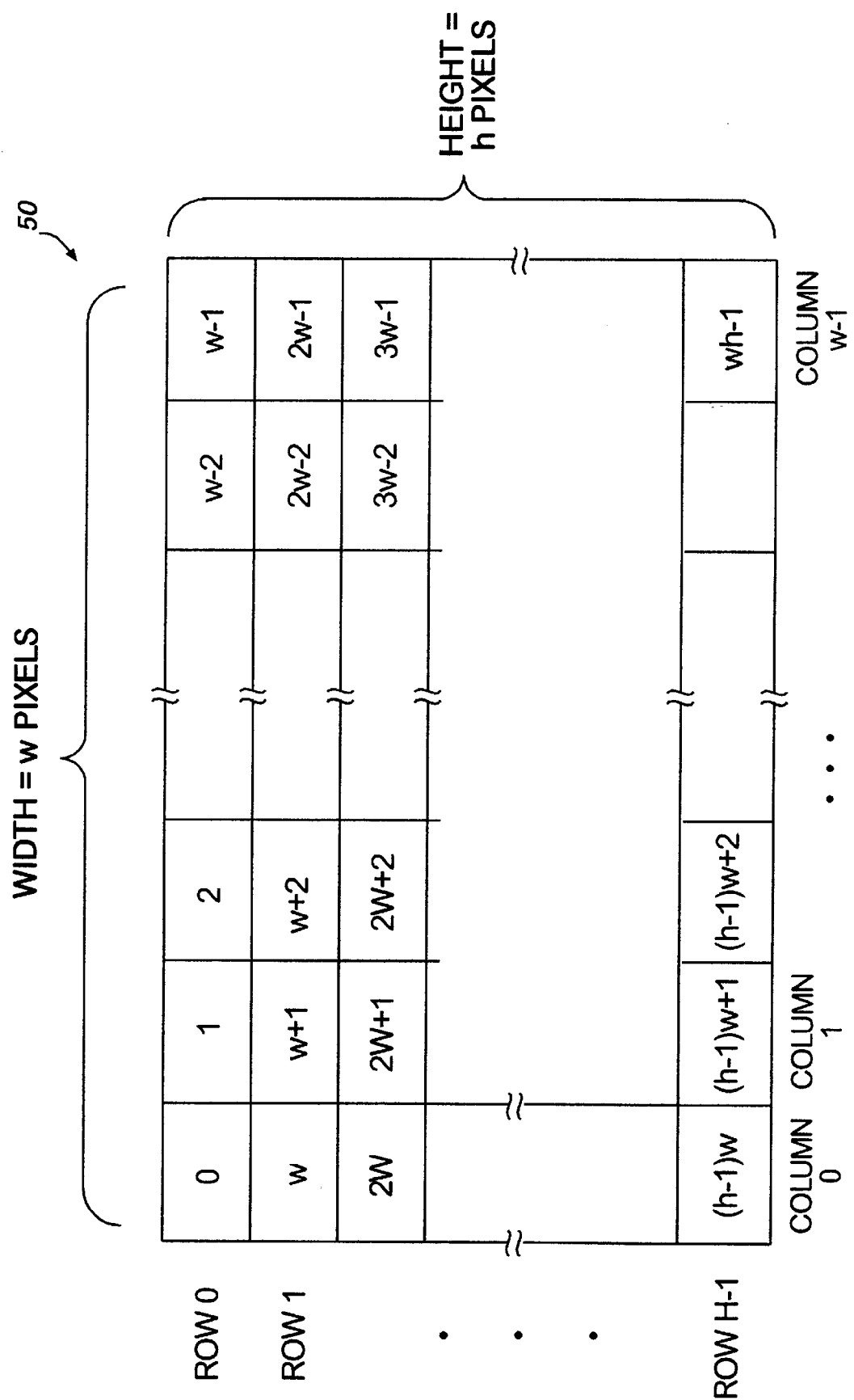
FIG. 2 is a diagram showing the pixels corresponding to an image displayed on a computer screen.

FIG. 2 is a diagram showing the pixels representing an image, generally shown at 50, displayed on a computer screen. As stated above, the image 50 is preferably a graphical image. For the sake of simplicity of discussion, the image 50 is shown as being a rectangle having a width of "w" pixels and a height of "h" pixels. However, it should be understood that the image is not limited to a rectangular shape and can include any shape or orientation. Furthermore, although the image discussed herein will be considered a graphical image, the present invention is not limited to graphical images and may be implemented for any type of image displayed on a computer screen, including text, alphanumeric characters, or any other image.

As seen in FIG. 2, the image 50 includes a total of w*h pixels, where * is the multiplication operator. Each pixel in the image is identified by a number, beginning from pixel 0 and ending with pixel (w*h)−1. The top row of pixels in the image is identified as row 0, the second row of pixels is identified as row 1, and so forth such that the bottom row of pixels in the image is identified as row (h−1). Similarly, the leftmost column of pixels is identified as column 0, the second column of pixels is identified as column 1, and so forth such that the rightmost column of pixels is identified as column (w−1). As seen in FIG. 2, the pixel numbering of each pixel in the image begins with pixel 0 in row 0, column 0. The numbering of pixels proceeds horizontally in numerical order such that the pixel in row 0, column 1 is identified as pixel 1 and the pixel in row 0, column 2 is identifed as pixel 2, and so on. After the pixel at the end of the row is identified as pixel (w−1), the numbering proceeds with the leftmost pixel in the next row. In this manner, each pixel of the image has an identifying number depending on each pixel's location within the image.

As stated above, the preferred embodiment of the present invention identifies the sequence by which pixels of an image are replaced on the computer screen. The sequence is a pseudo-random order to achieve a visually-pleasing "dissolve" effect. For the purposes of the detailed description herein, a first image (the current image), displayed on the computer screen, is dissolved when each pixel comprising the current image is progressively replaced with a corresponding pixel from a second image (the source image). A pixel of a current image is deemed to be replaced on the computer screen when the display of the pixel is changed by the computer system such that the pixel no longer displays a portion of the current image but rather displays a portion of the source image. Therefore, the computer system controls the display of images on the computer screen by controlling the display of each pixel on the computer screen.

It should be understood that the methods of all embodiments of the present invention described herein are implemented via a program module or computer program stored in the memory of the computer 10, described in FIG. 1. The program module may be stored as part of the operating system 36 or as a part of an application program 37. The program module may also be stored on a hard disk drive, a floppy disk drive, a CD-ROM drive, or any other appropriate storage medium. The image displayed in accordance with the invention described herein is displayed on an output device, typically a pixel-oriented computer monitor 31 having a computer screen 31a.

The method of determining the sequence of the replacement of pixels is described with reference to the flow chart of FIG. 3. The method begins at START step 60. At step 65, values for the variables p and m are selected. The variables p and m are preferably selected in the following manner. The variable p must be a prime number. Of course a prime number is a number that can only be divided by itself and the number one such that the quotient is an integer. Prime numbers include 2, 3, 5, 7, 11, 13, 17, etc.

After the prime number p is chosen, the variable m, called a primitive root of unity modulo p, is selected. The variable m is selected such that the set of values m, $m^2$, $m^3$, . . . , $m^{p-1}$, when taken modulo p, yield a permutation, i.e., reordering, of the values 1, 2, 3, . . . , p−1. As is well known, the modulo mathematical operation, denoted by the "mod" operator, effectively divides two numbers and retains only the remainder, if any, of the quotient. If the result is less than 1, the modulo operation returns the value of the numerator. For example, if the number 19 is taken modulo 3 (19 mod 3), the operation yields a result of 1 because 19/3=6 with a remainder of 1. Similarly, the number 19 taken modulo 4 (19 mod 4) yields a value of 3 because 19/4=4 with a remainder of 3. The number 19 taken modulo 21 (19 mod 21) yields a result of 19 because 19/21<1.

For any value of p, numerous values of m may be selected. The preferred embodiment of the present invention selects the value of $p=2^{16}+1$ and the value of $m=2^{15}-1$. Thus, the preferred embodiment uses p=65537 and m=32767. However, it should be understood that the present invention is not limited to specific values of p and m, and the values of p and m may be selected to be any values determined as described above. It should also be understood that the selection of p and m may be performed either automatically by the processor during execution of the computer program, or manually by a computer programmer or other person before the computer program is executed.

After the values of p and m are selected, a random number $k_0$ is selected at step 70. The number $k_0$ is selected such that:

$$1 \leq k_0 \leq p-1.$$

At step 75, the value of variable k is set initially to equal $k_0$. The method then proceeds to step 80.

At step 80, the value j is calculated. The value j corresponds to a unique pixel number in the image. Each pixel in the image is identified by a unique pixel number. The value of j is calculated according to formula (1):

$$j=(w*h)+k-p, \qquad (1)$$

where w and h are the width and height, in pixels, of the image to be dissolved. At step 90, it is determined if the value of j calculated at step 80 is non-negative. If the value of j determined at step 90 is such that j≧0, the method follows "yes" branch 91 to step 95.

At step 95, the value of variable x is determined. The variable x corresponds to the x-coordinate of the pixel in the image, i.e., the value of x determines the column in which the pixel identified by j is located. The value of x is determined by formula (2):

$$x=j \bmod w. \qquad (2)$$

At step 100, the value of variable y is determined. The variable y corresponds to the y-coordinate, i.e., the row, of the pixel identified by the value of j. The value of y is determined by the formula:

$$y=j/w, \qquad (3)$$

where the operator / is the integer division operator. The integer division operator divides two numbers, retains the integer value of the quotient, and discards the remainder, if any.

At step 105, the pixel identified by pixel number j, displayed at column x and row y in the image, is replaced. It should be understood that for the purposes of this discussion, an image is dissolved by replacing each individual pixel from a current image with a corresponding pixel from a source image in a specific sequence such that the current image gradually disappears from the screen and the source image gradually appears on the screen.

At step 110, a new value of j is calculated according to the formula:

$$j_{new}=j-(p-1). \qquad (4)$$

After $j_{new}$ is calculated, the value of j is set equal to $j_{new}$ at step 112 and the method then returns to step 90.

If, at step 90, it is determined that the value of j is less than zero, the method follows "no" branch 92 to step 115. At step 115, a new value of k is set according to the formula $$k_{new}=(k*m) \bmod p. \qquad (5)$$

After $k_{new}$ is calculated at step 115, the method proceeds to step 120, where it is determined whether knew equals $k_0$. If $k_{new}$ equals $k_0$, the method follows "yes" branch 121 and the method terminates at 130. If $k_{new}$ does not equal $k_0$, the method follows "no" branch 122 to step 125 where the value of k is set equal to $k_{new}$. The method then returns to step 80.

One of the advantages of selecting the value of p and m as specified above is that such values allow for fast calculations of $k_{new}=(k*m) \bmod p$ in the method for determining the sequence of pixel numbers j. It is well known to those skilled in the art that computers can perform addition, subtraction, and bitwise operations such as "and" and "shift" much faster than multiplication and division operations. For example, an addition operation typically requires only one clock cycle while a multiplication or division operation typically requires approximately 30–40 clock cycles. As will be described more fully below, selecting the respective values of p and m to be of the form $p=2^e+1$ and $m=2^c-1$, for some positive integers e and c, such that p is a prime number and m is a primitive root of unity modulo p, allows the calculation of $k_{new}=(k*m) \bmod p$ to be accomplished without multiplication or division operations. Therefore the method described in the flow chart of FIG. 3 can be accomplished much faster than would be possible for other selections of p and m. It should be understood that there are other similar forms that provide values of p and m that allow fast computations. The present invention may be utilized with any suitable selections of p and m and should not be construed to be limited solely to the forms illustrated above.

The calculation of knew according to the formula $k_{new}=(k*m) \bmod p$ involves a multiplication operation and a division operation (the modulo operation includes a division operation). However, the selection of $p=2^e+1$, where e is a positive integer such that p is a prime number, and $m=2^c-1$, where c is a positive integer such that m is a primitive root of unity modulo p, allow the calculation of $k_{new}$ to be accomplished as follows:

$$k*m=k(2^c-1)=k*2^c-k=(k<<c)-k \qquad (6)$$

where << is the left shift operator, which causes the binary digits of k to be shifted c positions to the left with 0's being placed in all positions from which digits have been shifted. Therefore, the value of m specified above allows for the value of k*m to be calculated using only left shift and subtraction operations, thereby eliminating the multiplication operation.

The selection of p and m also allows the modulo operation to be accomplished without multiplication or division operations. In the example below, the value of k*m, as calculated above in formula (6), will be designated by the value "x". The calculation of $k_{new}=x \bmod p$ can then be reduced to:

$$k_{new}=x \text{ AND } (p-2)-(x>>e), \qquad (7)$$

where AND is the bitwise "and" operator and >> is the right shift operator. If the total on the right hand side of the equal sign is less than zero, then p should be added to the total to give the value of $k_{new}$.

Therefore, the selection of p specified above allows for the value of x mod p to be calculated using only bitwise "and", right shift, and subtraction operations, thereby eliminating the division operation typically required when performing the modulo operation. Thus, by selecting p and m as specified above, the entire calculation of $k_{new}$ is accomplished without multiplication or division operations, thereby increasing the speed at which the computer performs the inventive method.

Figure 6:
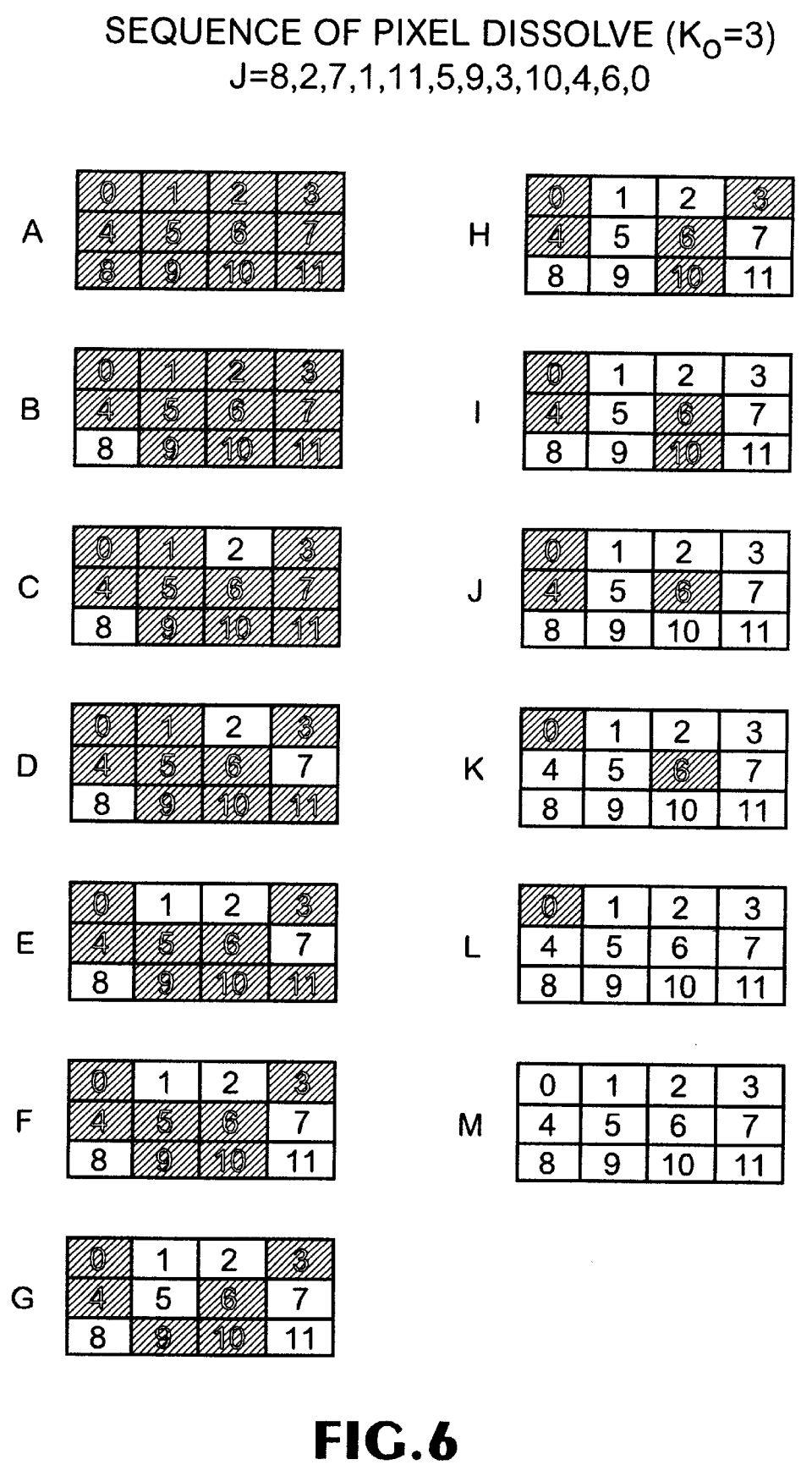

A representation of the method of determining the sequence of pixels to be replaced in accordance with the preferred embodiment of the present invention is shown in FIGS. 4–6. For purposes of the example described below, the values of p and m have been selected as 7 and 3, respectively. FIG. 4 illustrates how the values of m, $m^2$, . . . , $m^{p-1}$, when taken modulo p, yield a reordering of the values 1, 2, . . . , p−1. As shown in FIG. 4, the reordering is the sequence 3, 2, 6, 4, 5, 1. Thus, for the prime number 7, the value 3 can be used as the variable m.

In this example, a representative image to be dissolved is shown in FIG. 5. The image, generally shown at 140, consists of 12 pixels. The image 140 consists of three rows of four pixels. Therefore, for image 140, the width w equals 4 and the height h equals 3. The pixels are numbered 0–11, as shown in FIG. 5, with pixel 0 being located at the upper left corner of the image and pixel 11 being located at the lower right corner of the image.

Figure 3:
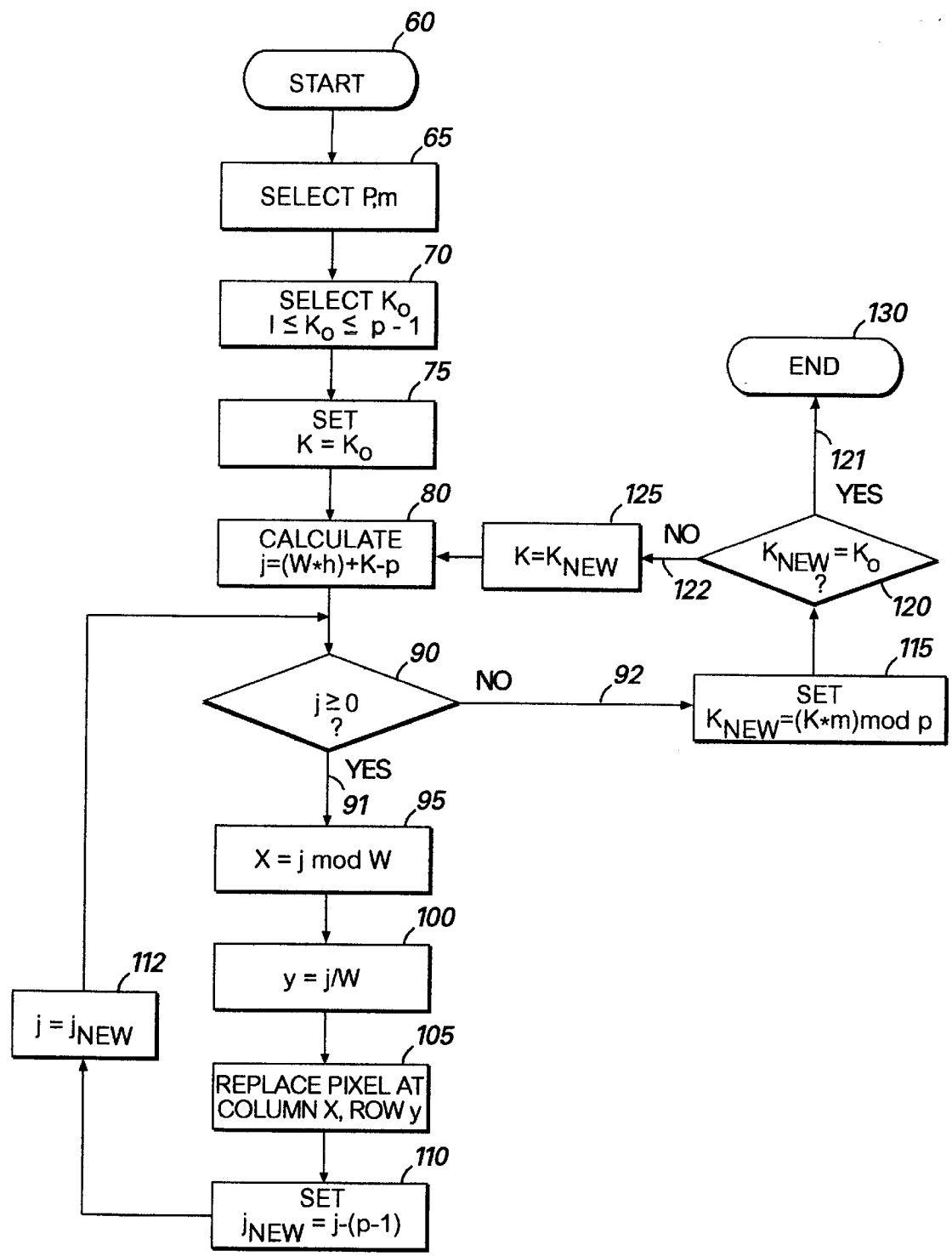
FIG. 3 is a flow chart describing the method of determining the sequence in which pixels are replaced on the computer screen, in accordance with the preferred embodiment of the present invention.

The sequence for replacing pixels in the image is determined by using the method illustrated in the flow chart of FIG. 3. For purposes of this example, the value of ko is randomly selected to equal 3. It should be understood that ko may be selected to be any value between 1 and p−1, inclusive. The selection of a different value of $k_0$ will not alter the sequence, but will cause the sequence of pixels to begin at a different position within the sequence.

Following the formulas and calculations of the method described above with reference to FIG. 3, the sequence of pixels to be replaced is calculated as follows: 8, 2, 7, 1, 11, 5, 9, 3, 10, 4, 6, 0.

The image 140 is gradually dissolved by replacing pixels in the sequence identified above. It should be understood that the sequence above identifies a particular order of pixel numbers. When the pixel numbers are obtained, those skilled in the art will easily be able to manipulate the signals that control the display of the computer screen to manipulate the display of the pixels corresponding to each pixel number in the sequence.

FIGS. 6A–M shows the image as it would appear after each successive pixel is replaced in the image. The shaded pixels represent pixels that comprise the current image and the unshaded pixels represent pixels that have been replaced with a pixel from the source image. It should be understood that once a pixel is replaced, it is not replaced again during the dissolve sequence.

FIG. 6A shows the image with each pixel being displayed. FIG. 6B shows the image after the initial pixel in the sequence, i.e., pixel 8, has been replaced. Similarly, FIG. 6C shows the image after the second pixel, i.e., pixel 2, has been replaced. For the preferred embodiment, once a pixel is replaced, it is not replaced again during the dissolve sequence. FIGS. 6C–M show the image after each successive pixel in the sequence has been replaced until the image is completely dissolved, as shown at FIG. 6M. The dissolve effect is generated by replacing successive single pixels from the current image with corresponding pixels from a source image over a predetermined time. Depending on the time over which all pixels are replaced, the dissolve effect may appear to be slow or fast. However, the present invention is not limited as to the time frame in which the dissolve effect is generated.

In a palletized device, when the current image uses a palette different than the palette of the source image, improper colors are displayed during the dissolve effect. For example, if the colors in the palette of the current image (the current palette) and the palette of the source image (the source palette) are different and the palettes are not changed during the dissolve effect, the source image will be displayed using the current palette. If the palettes are changed instantaneously after the dissolve effect, the source image will be displayed using the current palette throughout the dissolve effect and then will be instantly changed to be displayed using the source palette. Similarly, if the palettes are changed instantaneously before the dissolve effect, the current image will be instantly changed to be displayed using the source palette throughout the dissolve effect. These instantaneous palette changes produce visually displeasing images on the computer screen because images are displayed using improper colors.

The present invention gradually changes the current palette to the source palette during the dissolve effect. Therefore, during the dissolve effect, pixels of the current image are replaced with pixels of the source image and the current palette is simultaneously being gradually changed to the source palette.

The current palette is gradually changed to the source palette by linearly interpolating each palette entry between the color value in the current palette and the color value in the source palette. For example, consider that the entry in the current palette for color number 10 is (63, 255, 63). Also for purposes of this example, assume that the entry in the source palette for color number 10 is (255, 0, 0). During the dissolve effect, color number 10 will be set to:

$$(x/100)(255, 0, 0)+(1-x/100)(63, 255, 63) \qquad (8)$$

where x identifies the percent completion of the dissolve effect. Therefore, when the dissolve is fifty percent complete, color number 10 is calculated as (159, 127, 31) and the appropriate pixels are displayed on the screen using this new color. When the dissolve is ninety percent complete, color number 10 is calculated as (235, 25, 6).

Therefore, it should be appreciated that the colors at which pixels of the current and source images are displayed during the dissolve effect can be linearly changed to avoid instantaneous and drastic changes in color that produce displeasing visual effects.

Figure 7A:
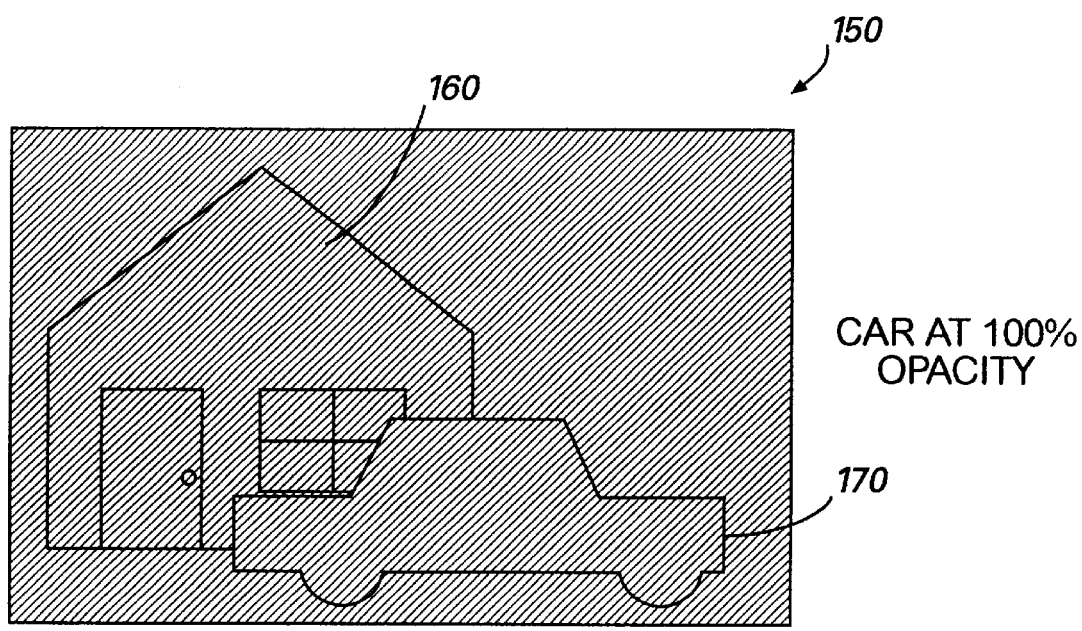
FIGS. 7A and 7B are diagrams showing an image displayed on a computer screen in which an object is displayed at different levels of opacity, in accordance with a second embodiment of the present invention.
Figure 7B:
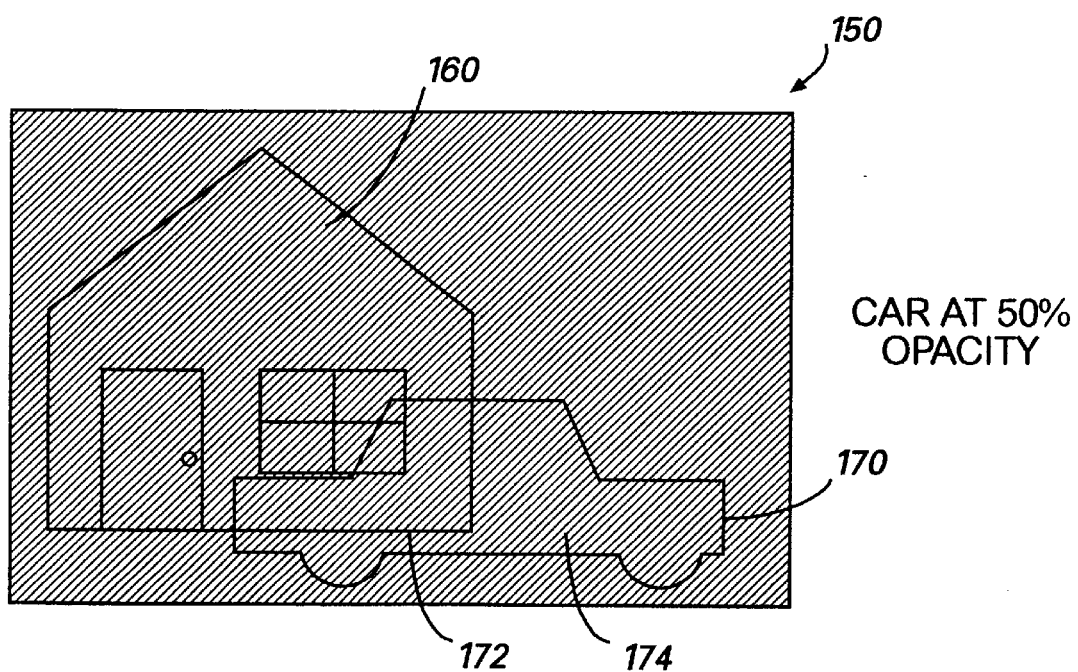

A second embodiment of the present invention is described with reference to FIGS. 7–13. FIGS. 7A and 7B show an image at different levels of opacity. The "opacity" of an image is the number of opaque pixels compared to the total number of pixels in the image. An opaque pixel is a pixel that displays a portion of the image. Conversely, a transparent pixel does not display a portion of the image, but may be used to display an underlying image. As seen in FIG. 7A, the display, generally shown at 150, includes a first image of a house 160 and a second image of a car 170. In FIG. 7A, the image of the car is displayed at 100 percent opacity, i.e., every pixel within the boundary of the car is used to display the image of the car 170. Thus, each pixel within the image of the car 170 is opaque. Conversely, the image of the car 170 displayed in FIG. 7B is displayed at 50 percent opacity, which means that half of the pixels within the image of the car are used to display the car. The pixels within the boundary of the car 170 that are not used to display the car may be used to display an underlying image, if any. Therefore, in the example of FIG. 7B, transparent pixels within the boundary of the car 170 may be used to display the underlying image of the house 160 in the region of overlap of the house and car, identified at 172. Thus, it should be understood that the degree of opacity of an image is determined by the relative comparison of opaque pixels to the total number of pixels within the image.

Figure 8:
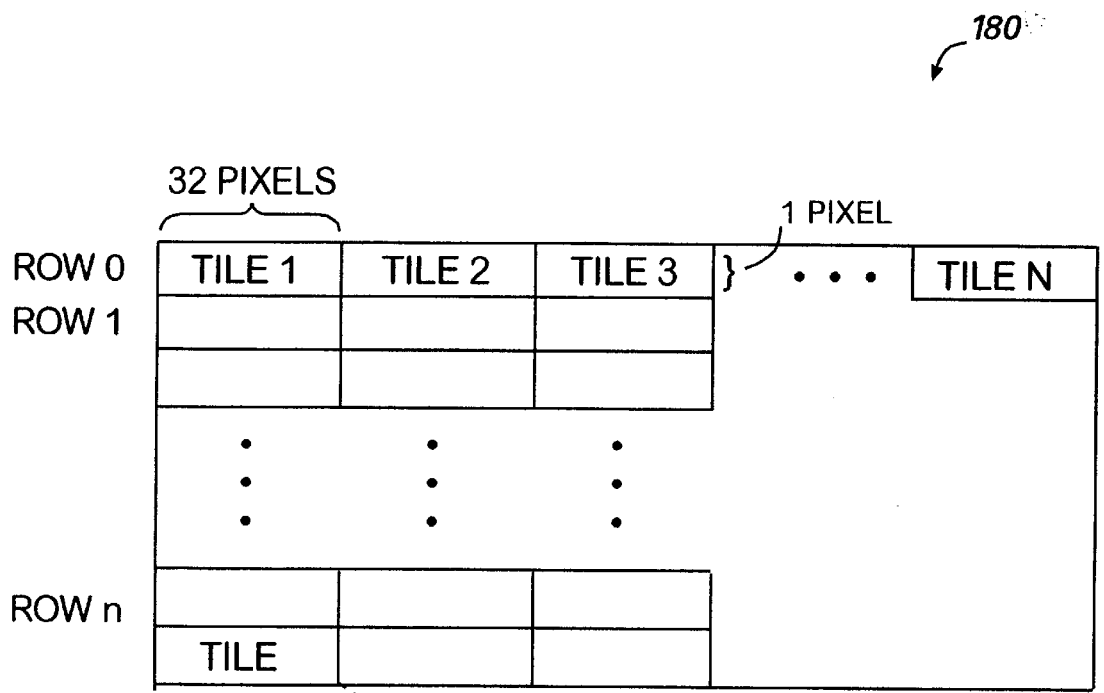
FIG. 8 is a diagram showing an image displayed on a computer screen as a plurality of tiles, in accordance with a second embodiment of the present invention.

In accordance with the second embodiment of the present invention, an image, generally shown at 180, is divided into tiles, as shown in FIG. 8. Each tile is 32 pixels wide by 1 pixel high. The representative image described herein is a rectangle having dimensions that include only complete tiles. However, an image may have dimensions requiring one or more tiles to be displayed in less than their entirety. It should also be understood that the image is not limited to a rectangular shape and can include any shape or orientation.

Furthermore, although the image discussed herein will be considered a graphical image, the present invention is not limited to graphical images and may be implemented for any type of image displayed on a computer screen, including text, alphanumeric characters, or any other image.

The display of each tile that comprises the image 180 is determined according to a dither pattern. The dither pattern is preferably a 32 bit value that defines which pixels within a tile are displayed as opaque, i.e., which pixels are used to display a portion of the image, and which pixels within a tile are transparent, and thus are not used to display a portion of the image.

Figure 9:
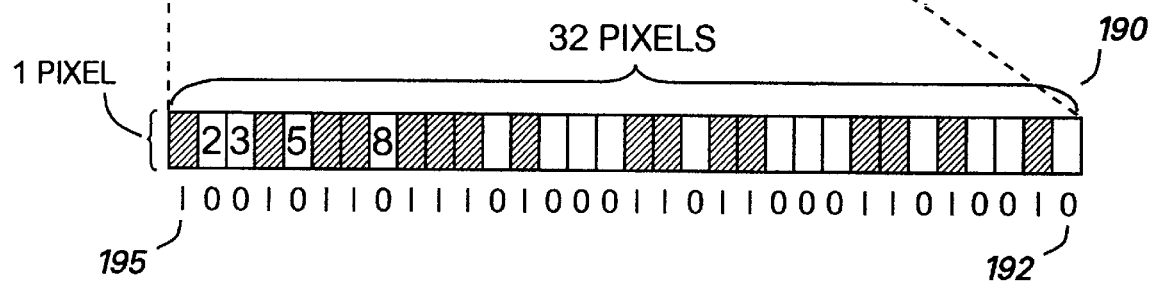
FIG. 9 shows a tile comprising 32 pixels displayed at 50 percent opacity and the corresponding 32 bit dither pattern for the tile, in accordance with a second embodiment of the present invention.

FIG. 9 shows a tile 190 of image 180 displayed at 50 percent opacity and its corresponding preferred dither pattern 192. As seen in FIG. 9, the tile 190 comprises 32 pixels, 16 of which are opaque. Thus, the tile is displayed at 50 percent opacity. The 32 bit value of the dither pattern is shown at 192. The values of each bit of the dither pattern determine whether a corresponding pixel in the tile will be either opaque or transparent. The first bit 195 in the 32 bit dither pattern corresponds to the first pixel in the tile. Similarly, each successive bit in the dither pattern corresponds to each successive pixel in the tile. Therefore, bit 1 corresponds to pixel 1, bit 2 corresponds to pixel 2, and so forth until bit 32 corresponds to pixel 32. As shown in FIG. 9, a bit value of 1 in the dither pattern causes the corresponding pixel to be opaque and a bit value of 0 in the dither pattern causes the corresponding pixel to be transparent.

Each tile in a row has the same dither pattern and therefore displays an identical sequence of opaque and transparent pixels. Thus, as shown in FIG. 8, each tile 1-N in the top row of the image 180 displays an identical arrangement of opaque and transparent pixels. To determine which pixels are opaque and which are transparent in the other rows of the image, each subsequent row will use a dither pattern randomly chosen from a plurality of dither patterns having the same total number of opaque and transparent pixels as the dither pattern used for the previous row. However, preferably the dither pattern for each subsequent row has the opaque and transparent pixels arranged in a different 32 bit sequence. Preferably, the dither pattern for a subsequent row is randomly selected from the eight dither patterns in the appropriate row of dither patterns, as shown in FIG. 12.

Additionally, the bits in the dither pattern for subsequent rows are shifted to the left by a random number of bits. A random number generator, as is well known in the art, is used to generate a random number between zero and 32. The bits that comprise the dither pattern are then shifted to the left by the random number generated by the random number generator. The pixels in each tile in each subsequent row are displayed in accordance with the shifted dither pattern. In this manner, undesirable, visually-perceptible patterns in the image during a dissolve are avoided.

Although the dither patterns discussed herein are described as 32 bit values, it should be understood that the present invention is not limited to 32 bit implementations. Therefore, dither patterns greater than or less than 32 bits may be utilized to achieve the visually pleasing results described herein. Similarly, the random number generator is not limited to generated numbers between zero and 32.

Figure 10:
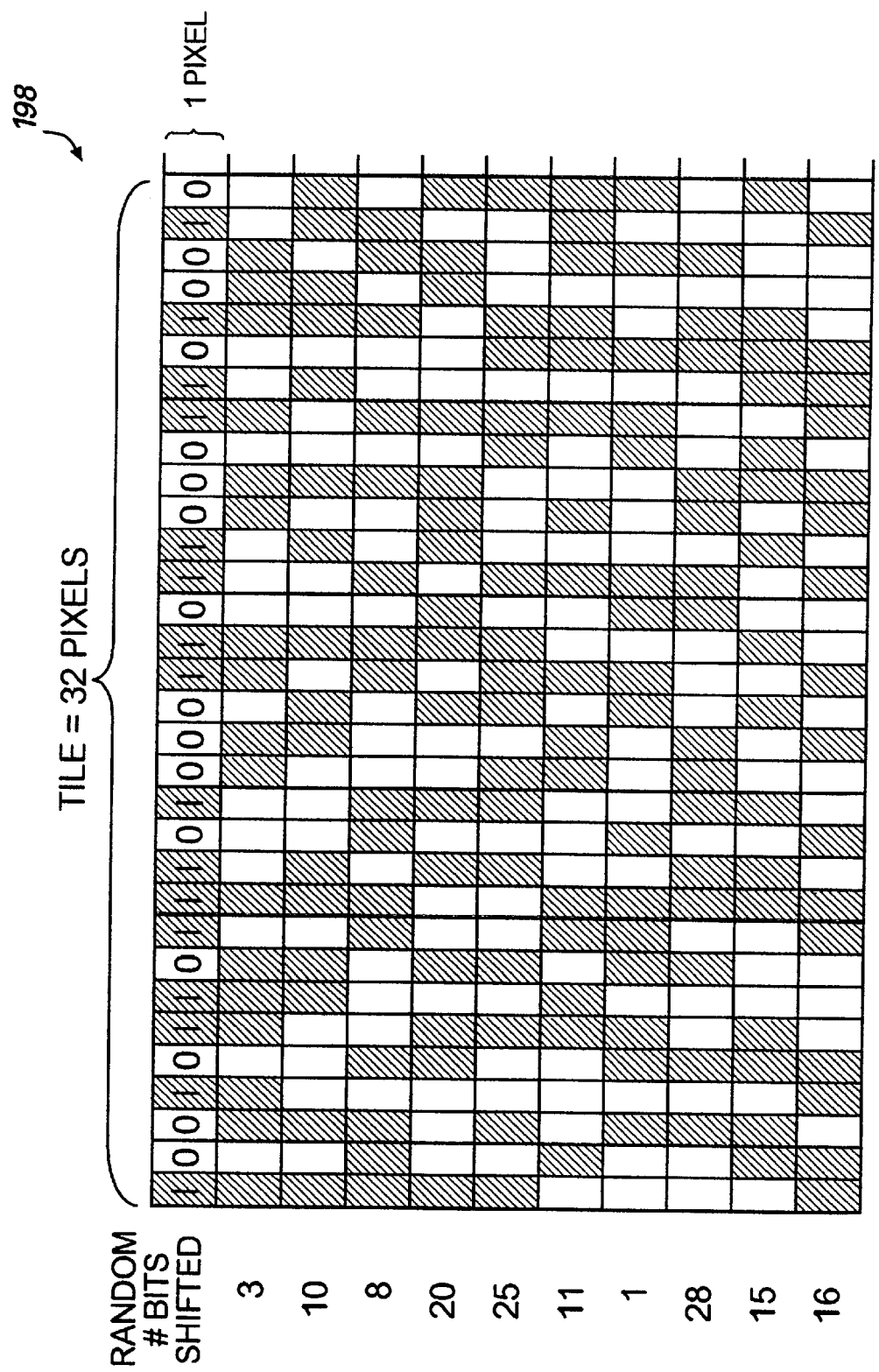
FIG. 10 is an image displayed at 50 percent opacity using the dither pattern of FIG. 9, in accordance with a second embodiment of the present invention.

The random number generator generates a different random number for each row in the image. An example of the display of an image at fifty percent opacity is shown in FIG. 10. For purposes of simplicity, the image 198 of FIG. 10 is only a single tile wide and eleven rows high. It should be understood that a typical image will be many tiles wide and each tile in a row will be displayed in an identical fashion.

In FIG. 10, the top row displays a tile according to the dither pattern shown in FIG. 9. It is seen that each subsequent row in the image uses the same dither pattern, but the bits in the dither pattern have been shifted to the left by a random number of bits. It should also be understood that, although the disclosed embodiment uses different dither patterns for each subsequent row of the image, the image of FIG. 10 is displayed using a single dither pattern for the sake of simplicity. The second row is displayed after shifting the dither pattern of row 1 to the left by 3 bits. The third row is displayed after shifting the dither pattern of row 1 to the left by 10 bits. The shifting of the dither pattern continues for each row in the image. It should be understood from the image of FIG. 10 that no visually-displeasing checkerboard, striping, or globbing of opaque or transparent pixels is evident in the image on the computer screen. Thus, the display of the pixels of the image at fifty percent opacity appears to be random and is visually pleasing to the viewer.

The method of displaying an image at a particular level of opacity is further described with reference to the flow chart of FIG. 11. The method begins at START step 200. At step 205, the opacity level at which to display the image is determined.

At step 210, a dither pattern is selected which determines which bits to display as opaque in each tile of the first row of the image. The dither patterns that may be selected, as shown in FIG. 12, are stored in a data structure maintained in the memory of computer 10.

FIG. 12 shows Tables 0–7, identified as reference numerals 250–257, respectively, each having 33 corresponding table entries. Although each entry in FIG. 12 is shown in hexadecimal form, it should be understood that each entry corresponds to a number represented in binary form as a sequence of 1's and 0's. This sequence of 1's and 0's is the dither pattern that identifies which pixels are opaque and which pixels are transparent. It should be understood that the present invention is not limited to the eight tables shown in FIG. 12, but that the present invention may be implemented with either zero or any number of alternate dither patterns.

Each table in FIG. 12 includes the same number of bits set to 1, however, the location of each bit set to 1 is different for each table. Therefore, when a dither pattern is selected, it may be selected from any of Tables 0–7. The number of the table from which the dither pattern is selected can be determined by a random number generator.

Each Table 0–7 includes 33 table entries. Each table entry corresponds to a particular opacity level. Table entry 0 is a dither pattern having all 32 bits set to 0. Thus, the dither pattern of table entry 0 causes none of the corresponding pixels of a tile to be opaque. Therefore, table entry 0 corresponds to zero percent opacity.

Table entry 1 is a dither pattern having one of the 32 bits set to 1. Therefore, table entry causes one of the 32 pixels of the tile to be opaque Table entry 1, therefore, corresponds to 3.125% opacity (1/32=0.03125). Each successive table entry includes an additional bit set to 1. Thus, each successive table entry corresponds to a greater opacity level than the previous table entry. For example, table entry 16 is a dither pattern having 16 bits set to 1 and 16 bits set to 0. Therefore, table entry 16 corresponds to 50% opacity (16/32=0.5). As will be understood, table entry 32 is a dither pattern having all 32 bits set to 1. Thus, table entry 32 corresponds to 100% opacity.

It should also be understood that the location of the bits set to 1 within each dither pattern are not arranged in a predetermined order. The bits in each dither pattern are preferably randomly assigned, with the only requirement being that each bit set to 1 in a prior table entry must be set to 1 in each subsequent table entry. For example, if table entry 1 has the bit in position 20 set to 1, the bit in position 20 must also be set to 1 in table entries 2–32. It should also be understood that the dither patterns used in the implementation of the present invention are not limited to the dither patterns shown in FIG. 12. Any dither pattern may be used in the present invention that causes a tile in an image to be displayed at a particular level of opacity.

Figure 11:
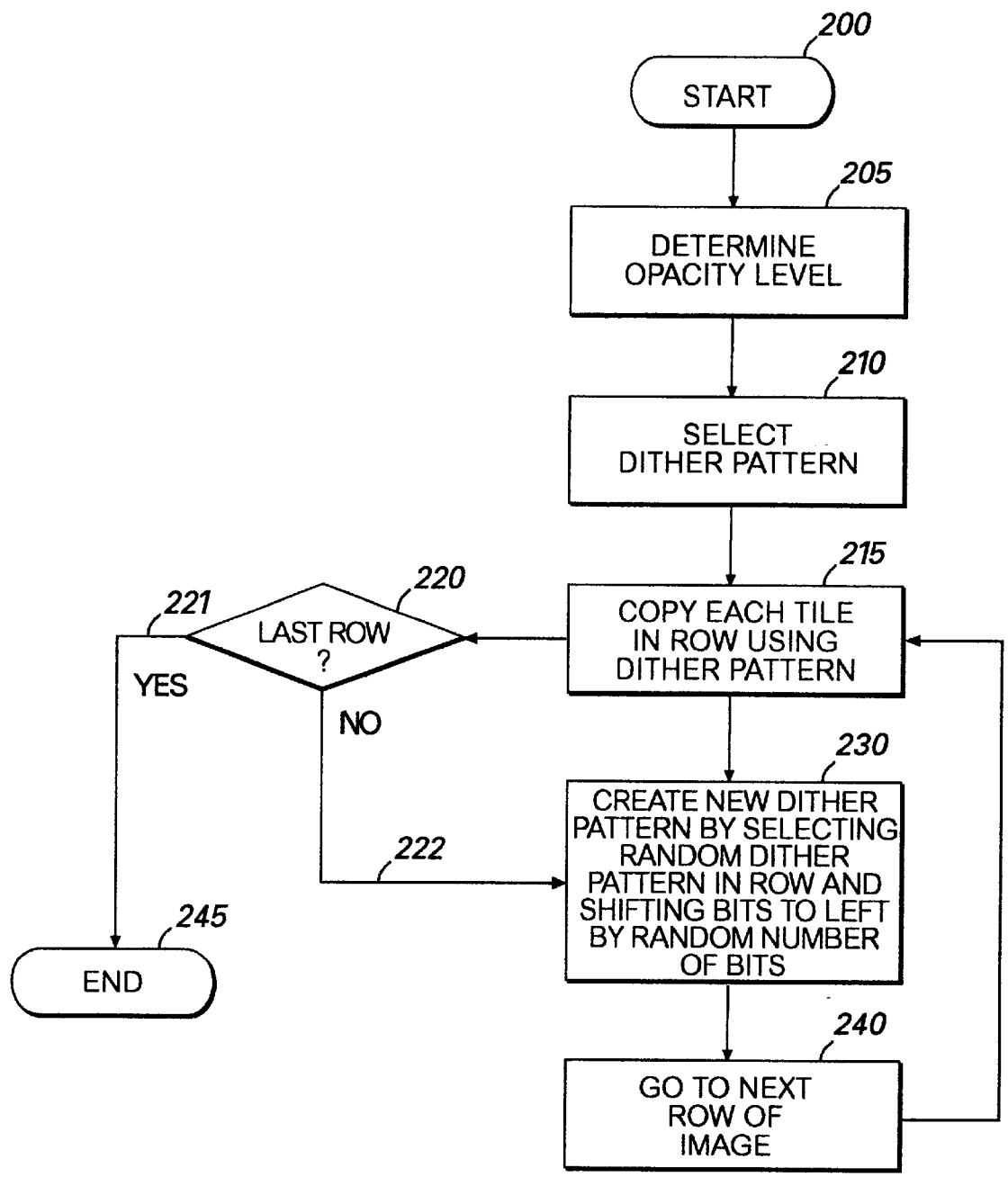
FIG. 11 is a flow chart describing the method of displaying an image at a particular level of opacity identified in the chart of FIG. 12, in accordance with a second embodiment of the present invention.

Referring to FIGS. 11 and 12, the method then proceeds to step 215 where each tile in the top row is displayed on the screen in accordance with the bits in the selected dither pattern. The method then proceeds to step 220, where it is determined if the row that was displayed was the last row in the image. If the displayed row is the last row, the method follows "yes" branch 221 and the method terminates at 245. If the displayed row is not the last row in the image, the method follows "no" branch 222 to step 230.

At step 230, a new dither pattern is created by randomly selecting a dither pattern in the same row in FIG. 12 and shifting the bits in the selected dither pattern by a random number of bits to the left. The number of the selected dither pattern (preferably 0–7) and the number of bits that the dither pattern is shifted (preferably 0–32) are separately determined by a random number generator. Preferably, in situations where a random number is generated, a repeatable random number generator is used, as is well known to those skilled in the art. By seeding the random number generator with the same seed value each time the method of the present invention is performed, the same sequence of random numbers can be generated.

The method then proceeds to the next row of tiles at step 240, and returns to step 215.

It should be understood that the tables shown in FIG. 12 correspond to 33 predetermined levels of opacity. The 33 levels are identified in the following table.

TABLE I

| Table Entry | Opaque Bits/Total Bits | % Opacity |
|---|---|---|
| 0 | 0/32 | 0 |
| 1 | 1/32 | 3.125 |
| 2 | 2/32 | 6.25 |
| 3 | 3/32 | 9.375 |
| 4 | 4/32 | 12.5 |
| 5 | 5/32 | 15.625 |
| 6 | 6/32 | 18.75 |
| 7 | 7/32 | 21.875 |
| 8 | 8/32 | 25.0 |
| 9 | 9/32 | 28.125 |
| 10 | 10/32 | 31.25 |
| 11 | 11/32 | 34.375 |
| 12 | 12/32 | 37.5 |
| 13 | 13/32 | 40.625 |
| 14 | 14/32 | 43.75 |
| 15 | 15/32 | 46.875 |
| 16 | 16/32 | 50.0 |
| 17 | 17/32 | 53.125 |
| 18 | 18/32 | 56.25 |
| 19 | 19/32 | 59.375 |
| 20 | 20/32 | 62.5 |
| 21 | 21/32 | 65.625 |
| 22 | 22/32 | 68.75 |
| 23 | 23/32 | 71.875 |
| 24 | 24/32 | 75.0 |
| 25 | 25/32 | 78.125 |
| 26 | 26/32 | 81.25 |
| 27 | 27/32 | 84.375 |
| 28 | 28/32 | 87.5 |
| 29 | 29/32 | 90.625 |
| 30 | 30/32 | 93.75 |
| 31 | 31/32 | 96.875 |
| 32 | 32/32 | 100.0 |

Therefore, when the desired level of opacity of an image is one of the 33 levels identified in the above table, the appropriate dither pattern is obtained from one of the table entries in FIG. 12. However, when the desired level of opacity is not one of the 33 levels listed above, the present invention utilizes the method described in the flow chart of FIG. 13 for determining the appropriate dither patterns for each row of the image.

Figure 13:
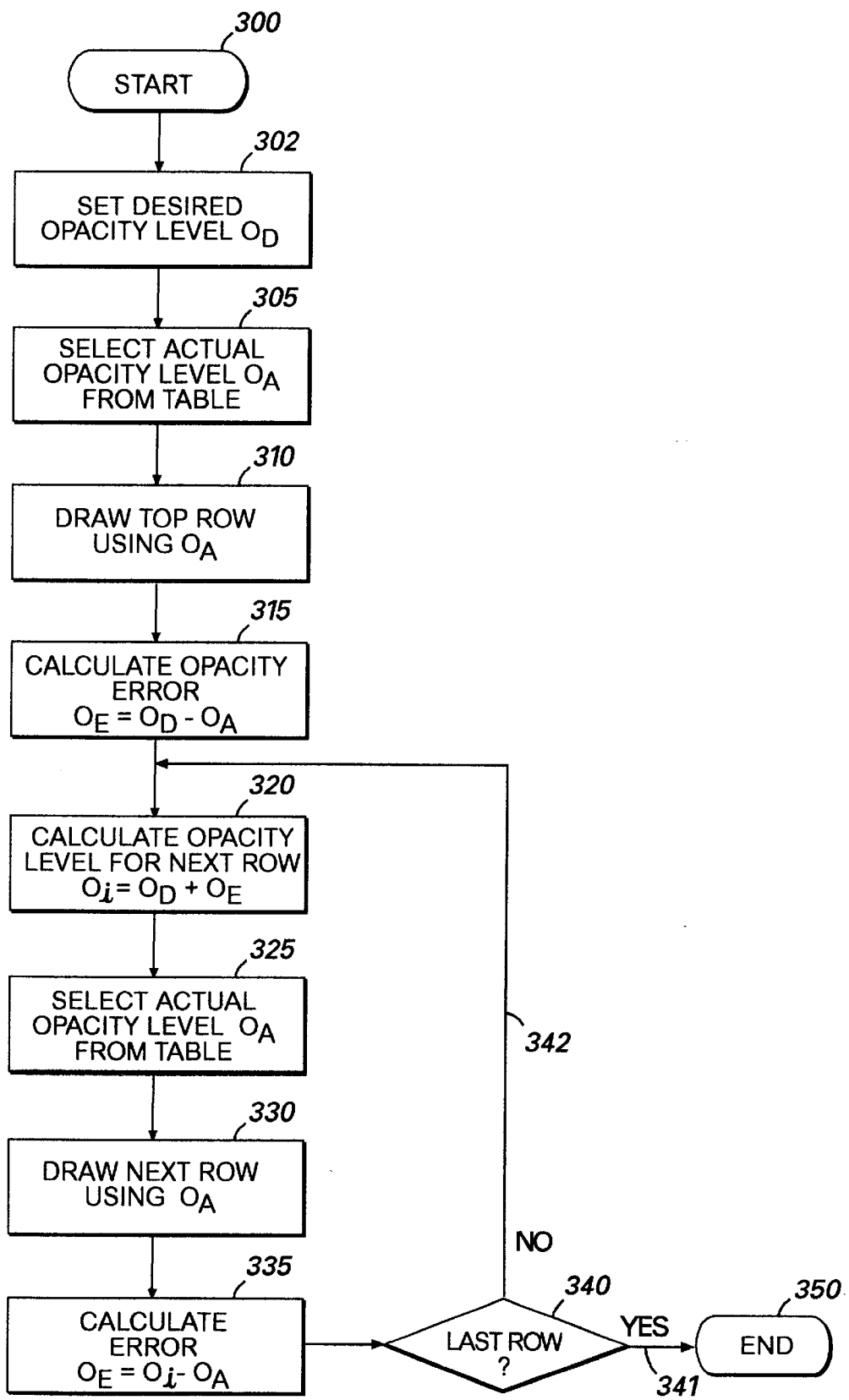
FIG. 13 is a flow chart describing the method of displaying an image at a level of opacity different than the levels identified in the chart of FIG. 12, in accordance with a second embodiment of the present invention.

The method of FIG. 13 begins at START step 300. At step 302, the desired level of opacity ($O_D$) of the image is determined. At step 305, a dither pattern, identified by a table entry, corresponding to an actual level of opacity ($O_A$) is selected from the table of FIG. 12. The dither pattern corresponding to the actual level of opacity is the opacity level closest to, but not exceeding, $O_D$. Then, at step 310, each tile of the top row of the image is drawn using the selected dither pattern.

At step 315, the opacity error ($O_E$) is calculated according to the formula:

$$O_E = O_D - O_A \qquad (9)$$

Then, at step 320, the opacity level for the next row ($O_i$) is calculated according to the formula:

$$O_i = O_D + O_E \qquad (10)$$

Once the value of $O_i$ is calculated, a new actual level of opacity $O_A$ is selected from the table, at step 325. The new actual level of opacity is the level closest to, but not exceeding, $O_i$. The dither pattern according to the new actual level of opacity is then used to draw each tile in the second row of the image, at step 330. At step 335, a new value of the opacity error $O_E$ is calculated according to the formula:

$$O_E = O_i - O_A. \qquad (11)$$

At step 340, it is determined whether the row last drawn is the last row of the image. If the row is the last row, the method follows "yes" branch 341 and the method terminates at 350. If the row is not the last row of the image, the method follows "no" branch 342 and returns to step 320.

For example, assume the desired opacity of an image is 4%. As shown in Table I above, no entry exists for an opacity level of 4%. The opacity levels closest to the desired level are table entry 1 corresponding to 3.125% opacity and table entry 2 corresponding to 6.25% opacity. For an image to be displayed at 4% opacity, dither patterns corresponding to both 3.125% and 6.25% must be used to display an appropriate number of rows such that the entire image is effectively displayed at the desired opacity level.

Using the method described in the flow chart of FIG. 13, for an image comprising 11 rows to be displayed at 4% opacity, the rows are displayed in Table II as follows:

TABLE II

| Row | Opaque Bits/Total Bits | Percent Opacity |
| --- | --- | --- |
| 0 | 1/32 | 3.125% |
| 1 | 1/32 | 3.125 |
| 2 | 1/32 | 3.125 |
| 3 | 2/32 | 6.25 |
| 4 | 1/32 | 3.125 |
| 5 | 1/32 | 3.125 |
| 6 | 1/32 | 3.125 |
| 7 | 2/32 | 6.25 |
| 8 | 1/32 | 3.125 |
| 9 | 1/32 | 3.125 |
| 10 | 2/32 | 6.25 |
| Total | 14/352 | 3.98% |

Table II above reveals that the above described image has a total of 11 tiles (11 rows, with each row having a single tile). Because each tile has 32 pixels, the entire image has 352 pixels. From Table II, it should be appreciated that the total number of opaque pixels in the image is 14. Therefore, the image has a total opacity of 14/352=3.98%. Of course, the greater the number of rows in the image, the closer the entire opacity of the image will be to the desired level of 4%. Thus, it should be understood that an image having any desired level of opacity may be displayed using a combination of dither patterns having other, predetermined opacity levels.

The method of FIG. 13 may cause a small number of pixels to disappear and later reappear when an image displayed at a greater opacity level is gradually dissolved to a lesser opacity level. Similarly, a small number of pixels may appear and later disappear when an image displayed at a lesser opacity level is gradually dissolved to a greater opacity level. To eliminate this effect, the present invention may select a dither pattern from one of table entries 0–33 in FIG. 12 corresponding to the opacity level closest to the desired opacity level. This selected table entry can then be used to display each row of the image. Although this provides only a finite number of opacity levels, the sparkle effects previously described are eliminated.

From the foregoing, it will be appreciated that the preferred embodiment of the present invention overcomes the drawbacks of the prior art described hereinabove. From the description of the preferred embodiment, equivalents of the elements shown therein will suggest themselves to those skilled in the art and ways of constructing other embodiments of the present invention will suggest themselves to practitioners of the art. Therefore, the scope of the present invention is to be limited only by the claims below.

What is claimed is:

1. A method for dissolving a first image displayed on a pixel-oriented display of a computer into a second image by controlling the values of pixels representing the image, said first image being w pixels in width and h pixels in height and each pixel being identified by a unique non-negative number, comprising the steps of:

(a) selecting a prime number p;
   (b) selecting a number $k=k_0$, where $k_0$ is a number between 1 and p–1;
   (c) calculating a pixel number j in the current image according to the formula j=(w*h)+k−p;
   (d) determining if j is non-negative;
      if j is non-negative:
   (e) replacing the pixel corresponding to pixel number j in the first image with the corresponding pixel in the second image;
   (f) calculating a number $j_{new}$ according to the formula $j_{new}$=j−(p−1), and setting j=$j_{new}$; and
   (g) returning to step (d); and
      if j is negative:
   (h) calculating a number knew according to the formula $k_{new}$=(k*m) mod p, wherein m is a primitive root of unity modulo p, and setting k=$k_{new}$; and
   (i) returning to step (c).

2. The method of claim 1 wherein the pixel to be replaced in the first image, identified by pixel number j, is located at column x and row y of the first image, where x=j mod w and y=j/w.

3. The method of claim 1 wherein $p=2^e+1$ with e being a positive integer and $m=2^c-1$ with c being a positive integer.

4. The method of claim 3 wherein e=16 and c=15.

5. The method of claim 1 wherein all pixels in the first image have been replaced when $k_{new}=k_0$.

6. The method of claim 1 wherein each pixel in the first image displays a color associated with an entry in a current palette and each corresponding pixel in the second image displays a color associated with an entry in a source palette, and wherein the current palette is gradually changed to the source palette by linearly interpolating each palette entry between the color in the current palette and the color in the source palette.

7. A computer system operative to execute a program module for dissolving a first image displayed on a pixel-oriented display of an output device into a second image, said first image being w pixels in width and h pixels in height and each pixel being identified by a unique non-negative number, comprising:

a processing device;
   a memory, coupled to the processing device, for storing the program module, the program module operative to display an image; and
   an output device having a display, coupled to the processing device, for displaying an image,
   the processing device, responsive to instructions from the program module, operative to:
   (a) select a prime number p;
   (b) select a random number $k_0$ between 1 and p–1;
   (c) set a number $k=k_0$;
   (d) calculate a pixel number j according to the formula j=(w*h)+k−p;
   (e) determine if j is non-negative;
      if j is non-negative:
   (f) control the pixel value associated with the pixel corresponding to pixel number j in the first image to replace said pixel with the corresponding pixel in the second image; and
   (g) calculate a number anew according to the formula $j_{new}$=j−(P−1), and set j=$j_{new}$; and
   (h) return to (e); and
      if j is negative:
   (i) calculate a number $k_{new}$ according to the formula $k_{new}$=(k*m) mod p, wherein m is a primitive root of unity modulo p, and set k=$k_{new}$; and
   (j) return to (d).

8. The system of claim 7 wherein the pixel to be replaced in the first image, identified by pixel number j, is located at column x and row y of the first image, where x=j mod w and y=j/w.

9. The system of claim 7 wherein $p=2^e+1$ with e being a positive integer and $m=2^c-1$ with c being a positive integer.

10. The system of claim 9 wherein e=16 and c=15.

11. The system of claim 8 wherein all pixels in the first image have been replaced when $k_{new}=k_0$.

12. The system of claim 7 wherein each pixel in the first image displays a color associated with an entry in a current palette and the each corresponding pixel in the second image displays a color associated with an entry in a source palette, and wherein the current palette is gradually changed to the source palette by linearly interpolating each palette entry between the color in the current palette and the color in the source palette.

13. A computer-readable medium on which is stored a program module for dissolving a first image displayed on a pixel-oriented display into a second image, said first image being w pixels in width and h pixels in height and each pixel in said first image being identified by a unique non-negative number, the program module comprising instructions which, when executed by the computer, perform the steps of:

(a) selecting a prime number p;

(b) selecting a number $k=k_0$, where $k_0$ is a number between 1 and p−1;

(c) calculating a pixel number j in the current image according to the formula j=(w*h)+k−p;

(d) determining if j is non-negative;
if j is non-negative:

(e) replacing the pixel corresponding to pixel number j in the first image with the corresponding pixel in the second image;

(f) calculating a number $j_{new}$ according to the formula $j_{new}$=j−(p−1), and setting j=$j_{new}$; and (g) returning to step (d); and
if j is negative:

(h) calculating a number $k_{new}$ according to the formula $k_{new}$=(k*m) mod p, wherein m is a primitive root of unity modulo p, and setting k=$k_{new}$; and (i) returning to step (c).

14. The medium of claim 13 wherein the pixel to be replaced in the first, identified by pixel number j, is located at column x and row y of the first image, where x=j mod w and y=j/w.

15. The medium of claim 13 wherein $p=2^e+1$ with e being a positive integer and $m=2^c-1$ with c being a positive integer.

16. The system of claim 15 wherein e=16 and c=15.

17. The medium of claim 14 wherein all pixels in the first image have been replaced when $k_{new}=k_0$.

18. The medium of claim 13 wherein each pixel in the first image displays a color associated with an entry in a current palette and the each corresponding pixel in the second image displays a color associated with an entry in a source palette, and wherein the current palette is gradually changed to the source palette by linearly interpolating each palette entry between the color in the current palette and the color in the source palette.

* * * * *

UNITED STATES PATENT AND TRADEMARK OFFICE
CERTIFICATE OF CORRECTION

PATENT NO. : 5,771,033

DATED : June 23, 1999

INVENTOR(S) : Katzenberger

It is certified that error appears in the above-identified patent and that said Letters Patent is hereby corrected as shown below:

Col. 18, line 5, after the word "number" delete the word "knew" and insert the word -- $k_{new}$ -- in place thereof.

Col. 18, line 51, after the word "number" delete the word "anew" and insert the word -- $j_{new}$ -- in place thereof.

Signed and Sealed this

Thirtieth Day of November, 1999

Attest:

Attesting Officer

Q. TODD DICKINSON

Acting Commissioner of Patents and Trademarks